(12) United States Patent
Wen et al.

(10) Patent No.: US 9,917,661 B2
(45) Date of Patent: Mar. 13, 2018

(54) SYSTEM AND METHOD FOR TEST AND/OR CALIBRATION OF MULTI-CHANNEL RF COMMUNICATION DEVICES

(71) Applicant: Keysight Technologies, Inc., Minneapolis, MA (US)

(72) Inventors: Zhu Wen, Beijing (CN); Hong-Wei Kong, Beijing (CN); Ya Jing, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/153,544

(22) Filed: May 12, 2016

(65) Prior Publication Data
US 2016/0337052 A1 Nov. 17, 2016

(30) Foreign Application Priority Data

May 12, 2015 (CN) .......................... 2015 1 0237664

(51) Int. Cl.
*H04B 17/00* (2015.01)
*H04B 17/14* (2015.01)
(Continued)

(52) U.S. Cl.
CPC ........... *H04B 17/14* (2015.01); *H04B 7/0413* (2013.01); *H04B 10/2575* (2013.01);
(Continued)

(58) Field of Classification Search
CPC ..... H04W 24/00; H04W 24/08; H04W 52/52; H04B 17/0042; H04B 17/0057;
(Continued)

(56) References Cited

U.S. PATENT DOCUMENTS 6,105,157 A * 8/2000 Miller ................ G01R 31/3191
333/100
7,349,447 B1 3/2008 Sung et al.
(Continued)

FOREIGN PATENT DOCUMENTS

WO 2016064376 A1 4/2016

OTHER PUBLICATIONS

Office Action dated Oct. 21, 2016 in UK Patent Application No. 1608255.4.
(Continued)

*Primary Examiner* — Nhan Le (57) ABSTRACT

A test system includes a single-channel signal generator configured to generate an autocorrelation test signal to be distributed to each of a plurality of RF channels of a device under test (DUT). A time offset network includes a plurality of time offset channels each corresponding to one of the plurality of RF channels of the DUT, and is configured to, in combination with the DUT, provide corresponding autocorrelation test signals each with a different time delay as respective RF channel test signals. A single-channel measurement instrument is configured to process a single-channel test signal, based upon a combination of the RF channel test signals, to independently measure at least one characteristic of each of the RF channels of the DUT. The time offset network may be configured to be coupled between the single-channel signal generator and the DUT. Or, the time offset network may be configured to be coupled between the DUT and the single-channel measurement instrument.

25 Claims, 3 Drawing Sheets

(51) Int. Cl.
  *H04B 17/345* (2015.01)
  *H04B 7/0413* (2017.01)
  *H04B 10/2575* (2013.01)
  *H04B 17/12* (2015.01)

(52) U.S. Cl.
  CPC ....... *H04B 17/0085* (2013.01); *H04B 17/345* (2015.01); *H04B 17/12* (2015.01); *H04B 2210/006* (2013.01)

(58) Field of Classification Search
  CPC .............. H04B 17/004; H04B 17/0025; H04B 17/0012; H04B 17/0017; H04L 1/0026; H04L 1/0009; H04L 1/0003; H04L 1/20
  USPC ......... 455/67.11, 67.13, 67.14, 115.1, 115.2, 455/226.1
  See application file for complete search history.

(56) References Cited

U.S. PATENT DOCUMENTS

| | | | |
|---|---|---|---|
| 8,312,329 | B1 | 11/2012 | Yellapantula et al. |
| 8,576,947 | B2 | 11/2013 | Olgaard et al. |
| 8,912,963 | B2 | 12/2014 | Mow et al. |
| 8,995,926 | B2 | 3/2015 | Mow et al. |
| 9,107,098 | B2 | 8/2015 | Emmanuel et al. |
| 2004/0073860 | A1* | 4/2004 | Nishioka ................. H04L 1/203 714/746 |
| 2007/0070691 | A1 | 3/2007 | Walvis et al. |
| 2007/0070881 | A1 | 3/2007 | Olgaard et al. |
| 2007/0268833 | A1 | 11/2007 | daSilva |
| 2010/0007355 | A1 | 1/2010 | Olgaard et al. |
| 2011/0150050 | A1 | 6/2011 | Trigui et al. |
| 2012/0256639 | A1 | 10/2012 | Pausini et al. |
| 2013/0188509 | A1 | 7/2013 | Mellein et al. |
| 2014/0160955 | A1 | 6/2014 | Lum et al. |
| 2014/0361798 | A1 | 12/2014 | Johnson et al. |

OTHER PUBLICATIONS

Rowell, et al., "Practical Large Scale Antenna Systems for 5G Cellular Networks", 2015 IEEE International Wireless Symposium (IWS), Mar. 30-Apr. 1, 2015, Shenzhen, China, 4 pages.
Vieira, et al., "A Flexible 100-antenna Testbed for Massive MIMO", IEEE Globecom 2014 Workshop—Massive MIMO: From Theory to Practice, Dec. 8, 2014, Austin, Texas, USA, 8 pages.
International Search Report & Written Opinion dated Jan. 21, 2015 for International Application No. PCT/US14/61403, 7 pages.

* cited by examiner

SYSTEM AND METHOD FOR TEST AND/OR CALIBRATION OF MULTI-CHANNEL RF COMMUNICATION DEVICES

CROSS-REFERENCE TO RELATED APPLICATIONS

The present application claims priority under 35 U.S.C. § 119(e) from Chinese Patent Application No. 201510237664.4 filed on May 12, 2015 naming Zhu Wen, et al. as inventors. The entire disclosure of Chinese Patent Application No. 201510237664.4 is specifically incorporated herein by reference.

BACKGROUND

In general, RF communication systems and devices, like other electronics, require testing and, in some cases, calibration. Testing and calibration can present challenges in the case of an RF communication system or device which supports multiple transmission (Tx) and reception (Rx) channels.

Some traditional approaches use a single-channel measurement instrument to test and calibrate each channel of a multi-channel RF communication device individually, one-by-one, in sequence. However, these approaches have some drawbacks. First, the repeated connection and disconnection of the single-channel measurement instrument to the multi-channel RF communication device under test (DUT) using RF connectors will influence the testing accuracy and repeatability. Second, as the number of transmission and/or reception channels increases, the time required to perform test and calibration also increases. In particular, in the case of massive multi-input, multi-output (MIMO) communication systems which are now being developed, the number of channels is very large (in many cases more than 64) and as a result testing each of these channels one-by-one is very time consuming and in fact as the number of channels increases, the time required can be prohibitive.

Some other approaches use multiple test instruments, or a multi-channel test instrument, to test channels in parallel. However, a disadvantage of this approach is that when the number of channels is very large, the test instruments, or multi-channel test instrument, becomes too expensive and even impractical.

Thus, the existing test approaches cannot provide a suitable test system and method that has a fast testing speed and low cost for future massive MIMO systems. It would be desirable to provide a more convenient (e.g. faster testing speed and lower cost) and more reliable method and system to test and calibrate the performance of a multi-channel RF communication system or device.

SUMMARY

In an example embodiment, a test system includes a single-channel signal generator configured to generate an autocorrelation test signal to be distributed to each of a plurality of RF channels of a device under test (DUT). A time offset network includes a plurality of time offset channels each corresponding to one of the plurality of RF channels of the DUT, and is configured to, in combination with the DUT, provide corresponding autocorrelation test signals each with a different time delay as respective RF channel test signals. A single-channel measurement instrument is configured to process a single-channel test signal, based upon a combination of the RF channel test signals, to independently measure at least one characteristic of each of the RF channels of the DUT.

The time offset network may be configured to be coupled between the single-channel signal generator and the DUT. Or, the time offset network may be configured to be coupled between the DUT and the single-channel measurement instrument.

A combiner network may be configured to combine the RF channel test signals and to provide the single-channel test signal to the single-channel measurement instrument. The combiner network may be a calibrated combiner network configured to combine the RF channel test signals in a cable-conducted test mode and to output the single-channel test signal to the single-channel measurement instrument. Or, the combiner network may include an antenna arrangement configured to combine the plurality of RF channel test signals in an over-the-air (OTA) test mode and to provide the single-channel test signal to the single-channel measurement instrument.

Furthermore, in various embodiments, a distribution network may be downstream of the single-channel signal generator and configured to distribute the autocorrelation test signal for each of the plurality of RF channels of the DUT. The distribution network may be a calibrated distribution network configured to distribute the autocorrelation test signal in a cable-conducted test mode for each of the plurality of RF channels of the DUT. Or, the distribution network may include an antenna arrangement configured to distribute the autocorrelation test signal in an over-the-air (OTA) test mode for each of the plurality of RF channels of the DUT.

The at least one characteristic of each of the RF channels includes at least one of a power level, a bandwidth, and a distortion of the corresponding RF channel test signal from each of the RF channels of the DUT.

The DUT may include optical outputs, so the test system may include an optical-to-electrical converter coupled to optical outputs of each of the plurality of RF channels of the DUT upstream of the single-channel measurement instrument. The DUT may include optical inputs, so the test system may include an electrical-to-optical converter coupled to optical inputs of each of the plurality of RF channels of the DUT downstream of the single-channel signal generator.

The RF channel test signals, combined in the single-channel test signal, may be overlapped in a time domain. The single-channel signal generator may be configured to generate the autocorrelation test signal having autocorrelation characteristics including zero at non-zero time offset and non-zero at zero time offset.

In another example embodiment, a method of testing a DUT including a plurality of RF channels includes generating an autocorrelation test signal, with a single-channel signal generator, for distribution to each of a plurality of RF channels of the DUT. The method includes: generating respective RF channel test signals, corresponding to the autocorrelation test signals distributed to each of the plurality of RF channels of the DUT, each with a different time delay; and processing a single-channel test signal, based upon a combination of the RF channel test signals, with a single-channel measurement instrument to independently measure at least one characteristic of each of the RF channels of the DUT.

The autocorrelation test signal may be output from the single-channel signal generator to a time offset network to apply the different time delays of the respective RF channel test signals before input to the plurality of channels of the DUT. Alternatively, a corresponding autocorrelation test signal may be output from each of the plurality of channels of the DUT to a time offset network to apply the different time delays of the respective RF channel test signals before input to the single-channel measurement instrument.

Again, the at least one characteristic of each of the RF channels includes at least one of a power level, a bandwidth, and a distortion of the corresponding RF channel test signal from each of the RF channels of the DUT. The RF channel test signals, combined in the single-channel test signal, may be overlapped in a time domain. And, the single-channel signal generator may be configured to generate the autocorrelation test signal having autocorrelation characteristics including zero at non-zero time offset and non-zero at zero time offset.

The advantages of the system and method of the present embodiments is that a test approach may be provided with both faster test speed and lower cost. The test system and method use calibrated distribution/combiner networks and a time offset network that perform a parallel multi-channel RF performance test instead of using a slower switching approach. The test system and method use single-channel signal generation and signal analysis instruments to do the multi-channel RF performance test which results in a reduced test cost compared to a multi-channel instrument testing approach.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known systems and methods may be omitted so as to not obscure the description of the example embodiments. Such methods and systems are clearly within the scope of the present teachings.

Unless otherwise noted, when a first device is said to be connected to a second device, this encompasses cases where one or more intermediate devices may be used to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be used to couple the signal to the device. However, when a signal is said to be directly coupled to a device, this encompasses only cases where the signal is directly coupled to the device without any intermediate or intervening devices.

The present embodiments may provide a faster and lower cost measurement method and system that can perform multi-channel system RF performance (e.g. amplitude and phase) test and calibration under both a cable conducted test mode and OTA (Over-The-Air) test mode using single-channel signal generation and analysis instruments. The proposed method and system use a combiner network to combine multiple received signals that are fed to a single-channel analysis instrument to do RF performance analysis; and, the present embodiments use a single test signal and time-offset network to produce orthogonality among multiple channels.

Figure 1:
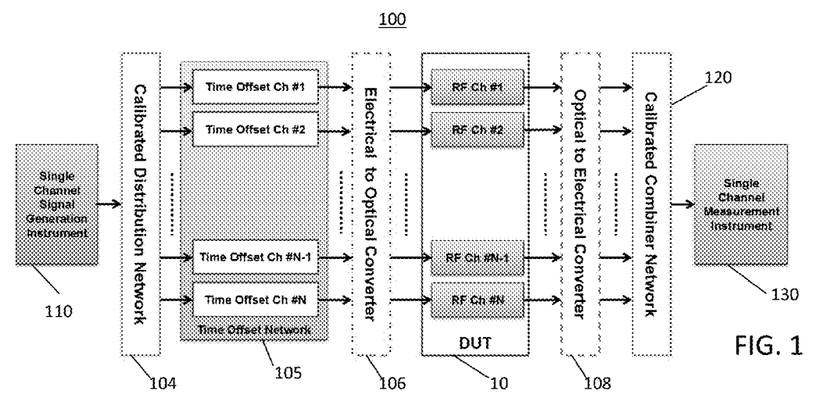
FIG. 1 is a schematic block diagram illustrating an example embodiment of a system architecture for testing a multi-channel RF system or device under test (DUT) in accordance with features of the present invention.

FIG. 1 illustrates a first example embodiment of a test system 100 for testing a multi-channel RF system or DUT 10. The test system of FIG. 1 is a cable conducted multi-channel RF performance test system.

The test system 100 includes a signal source or single-channel signal generator 110, a distribution network 104, a combiner network 120, and a single-channel measurement instrument 130. The test system 100 may also further include electrical-to-optical converter 106 and a corresponding optical-to-electrical converter 108 if appropriate. In particular, the test system 100 of FIG. 1 is an embodiment of a system for testing and/or calibrating a plurality of RF transmitters or receivers of a multi-channel RF device or DUT 10, particularly a multi-channel RF communication device or system.

In the test system 100 of FIG. 1, the single-channel signal generator 110 generates a test signal which has ideal autocorrelation characteristics (e.g. all zero at non-zero time offset and non-zero at zero time offset). Some examples for these signals include, but are not limited to, a Zadoff-Chu sequence, and a complementary Golay sequence, etc. The test signal is fed into the calibrated distribution network 104 which distributes the test signal into the time offset network 105.

For example, a Zadoff-Chu (ZC) sequence is a complex-valued mathematical sequence which, when applied to radio signals, gives rise to an electromagnetic signal of constant amplitude, whereby cyclically shifted versions of the sequence imposed on a signal result in zero correlation with one another at the receiver. These sequences exhibit the functional property that cyclically shifted versions of itself are orthogonal to one another, provided, that is, that each cyclic shift, when viewed within the time domain of the signal, is greater than the combined propagation delay and multi-path delay-spread of that signal between the transmitter and receiver.

Here, it is assumed that DUT 10 includes a plurality of RF channels 1-N which are capable of operating independently from each other. Each RF channel 1-N receives corresponding data, for example in the form of a baseband sequence, and is capable of generating therefrom an RF signal, wherein one or more parameters of the RF signal (e.g., a phase or frequency shift or modulation) is changed depending on the data so that the data is represented in such RF signal.

In the time offset network 105, each time offset channel 1-N applies a different time delay to the test signal, the multiple output signals of the time offset network 105 are inputted into the DUT 10, i.e. each time offset signal is fed into one RF channel 1-N in the DUT 10 respectively, then the calibrated combiner network 120 combines the multiple output signal from DUT 10 into a single-channel signal and feeds such signal into the single-channel measurement instrument 130 for further RF performance analysis. The electrical-to-optical converter 106 and/or optical-to-electrical converter 108 are needed if the DUT 10 has optical input and/or output interfaces. Depending on whether the DUT 10 is a transmitter or receiver, it might have different input and output interface combinations as will be described below.

So, in the described embodiment, the test system 100 includes a single-channel signal generator 110 configured to generate an autocorrelation test signal to be distributed to each of a plurality of RF channels of the DUT 10. The single-channel signal generator 110 may be configured to generate the autocorrelation test signal having autocorrelation characteristics including zero at non-zero time offset and non-zero at zero time offset.

A time offset network 105 includes a plurality of time offset channels 1-N each corresponding to one of the plurality of RF channels 1-N of the DUT 10, and is configured to, in combination with the DUT 10, provide corresponding autocorrelation test signals each with a different time delay as respective RF channel test signals. A single-channel measurement instrument 130 is configured to process a single-channel test signal, based upon a combination of the RF channel test signals, to independently measure at least one characteristic of each of the RF channels 1-N of the DUT 10.

The characteristics of each of the RF channels that are measured may include a power level, a bandwidth, and/or a distortion of the corresponding RF channel test signal from each of the RF channels 1-N of the DUT 10.

Figure 3:
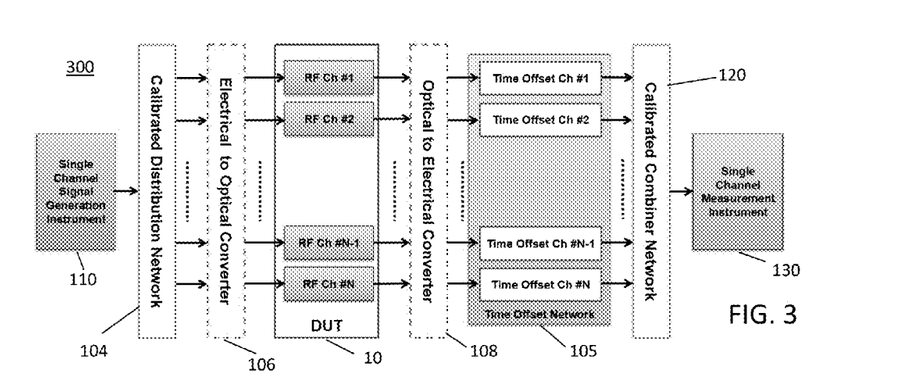
FIG. 3 is a schematic block diagram illustrating another example embodiment of a system architecture for testing a multi-channel RF system or DUT in accordance with features of the present invention.

In this embodiment, the time offset network 105 is configured to be coupled between the single-channel signal generator 110 and the DUT 10. Alternatively, in the test system 300 as illustrated in FIG. 3, the time offset network 105 may be configured to be coupled between the DUT 10 and the single-channel measurement instrument 130.

A combiner network 120 may be configured to combine the RF channel test signals and to provide the single-channel test signal to the single-channel measurement instrument 130. As illustrated in FIG. 1, the combiner network 120 may be a calibrated combiner network configured to combine the RF channel test signals in a cable-conducted test mode and to output the single-channel test signal to the single-channel measurement instrument 130.

Figure 4:
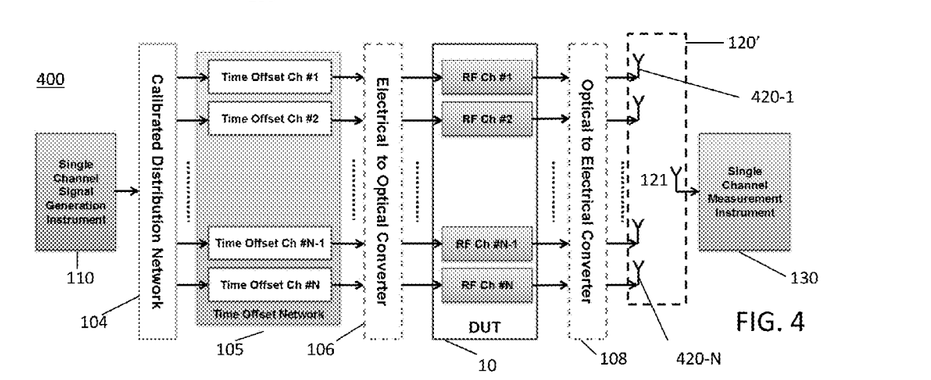
FIG. 4 is a schematic block diagram illustrating another example embodiment of a system architecture for Over-The-Air (OTA) testing of a multi-channel RF transmitter or DUT in accordance with features of the present invention.

Also, in the test system 400 as illustrated in FIG. 4, the combiner network 120' may be an antenna arrangement configured to combine the plurality of RF channel test signals in an over-the-air (OTA) test mode and to provide the single-channel test signal to the single-channel measurement instrument 130. For example, the plurality of RF channel test signals may be transmitted via respective antennas 420-1 through 420-N. An antenna device 121 associated with the single-channel measurement instrument 130 is configured to receive the plurality of RF channel test signals to provide the single-channel test signal for processing by the single-channel measurement instrument 130.

Furthermore, in various embodiments, a distribution network 104 may be downstream of the single-channel signal generator 110 and configured to distribute the autocorrelation test signal for each of the plurality of RF channels 1-N of the DUT 10. As illustrated in FIGS. 1, 3 and 4, the distribution network 104 may be a calibrated distribution network configured to distribute the autocorrelation test signal in a cable-conducted test mode for each of the plurality of RF channels 1-N of the DUT 10.

Figure 5:
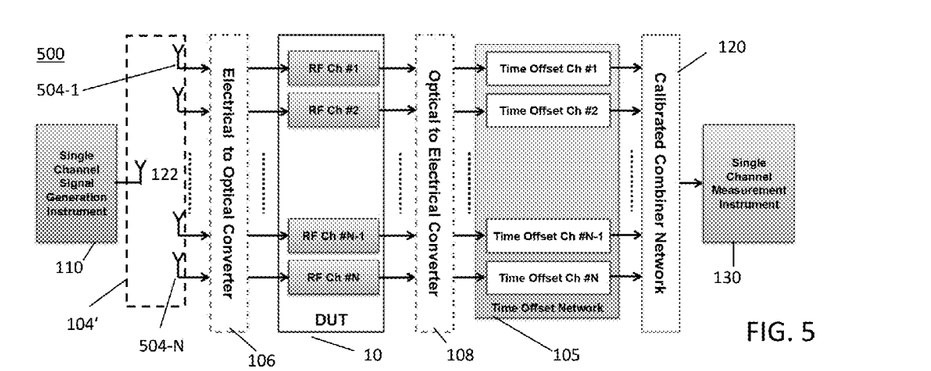
FIG. 5 is a schematic block diagram illustrating another example embodiment of a system architecture for Over-The-Air (OTA) testing of a multi-channel RF receiver or DUT in accordance with features of the present invention.

Also, in the test system 500 as illustrated in FIG. 5, the distribution network 104' may be an antenna arrangement configured to distribute the autocorrelation test signal OTA for each of the plurality of RF channels 1-N of the DUT 10. For example, the autocorrelation test signal may be transmitted to respective antennas 504-1 through 504-N for each of the channels 1-N of the DUT 10. Here, an antenna device 122 associated with the single-channel signal generator 110 is configured to transmit the autocorrelation test signal to the plurality of antennas 504-1 through 504-N of the distribution network 104'.

As discussed, the DUT 10 may include optical outputs, so the test system 100, 300, 400 and 500 may include an optical-to-electrical converter 106 coupled to optical outputs of each of the plurality of RF channels 1-N of the DUT 10 upstream of the single-channel measurement instrument 130. The DUT 10 may include optical inputs, so the test system 100, 300, 400 and 500 may include an electrical-to-optical converter 108 coupled to optical inputs of each of the plurality of RF channels 1-N of the DUT 10 downstream of the single-channel signal generator 110.

Figure 2:
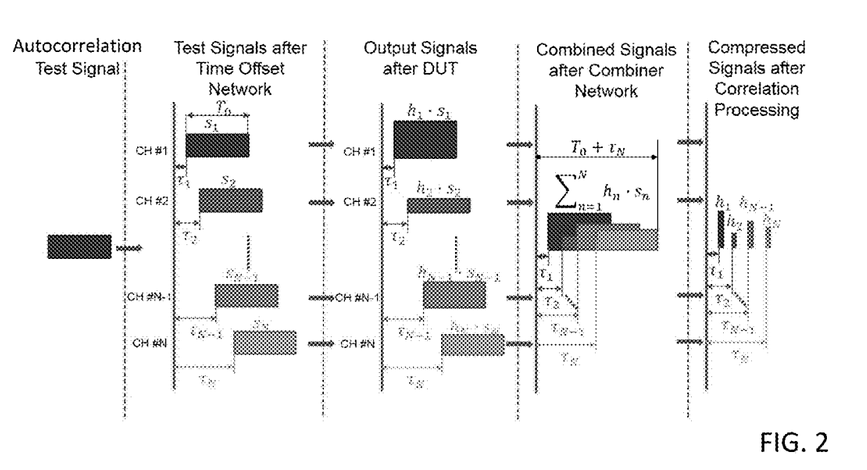
FIG. 2 is a signal processing diagram of the test system of FIG. 1.

The RF channel test signals, combined in the single-channel test signal to be processed by the single-channel measurement instrument 130, may be overlapped in a time domain as will be discussed with additional reference to the signal processing diagram of FIG. 2.

The major analysis processing for the RF performance analysis is to perform cross-correlation processing between the combined signal (i.e. the single-channel test signal) and the original test signal or autocorrelation test signal. The signal processing diagram of the multi-channel RF performance test system 100 is shown in FIG. 2. Because of the ideal autocorrelation characteristics of the autocorrelation test signal, the signal component $h_i \cdot S_i$ of RF channel i with time delay $\tau_i$ in the combined signals after combiner network 120 will be compressed as a pulse signal $h_i \cdot \sigma(\tau - \tau_i)$ whose peak is located at time $\tau_i$ after the cross-correlation processing, and its complex envelope $h_i$ (which consists of the amplitude and phase information of RF channel i) can be extracted easily.

Unlike being separated in the time domain (e.g. as in prior sequential switching single-channel testing approaches), in the present embodiments, the single-channel test signal from the different RF channels 1-N can be overlapped in the time domain after being combined in the combiner network 120, thus the testing time is equal to $T_0 + \tau_N$ (where $T_0$ is the time length of original test signal), and by selecting a suitable time delay $\tau_N (<T_0)$ the testing time can be much shorter than the time needed in such prior sequential switching single-channel testing approaches (which may be $N \cdot T_0$).

In some embodiments, the DUT 10 may be a massive multi-input, multi-output (MIMO) communication system having many RF channels 1-N. In some embodiments where the DUT 10 is a MIMO system, the DUT 10 may have at least N=64 RF channels 1-64. In some embodiments, the DUT 10 may have N=400 or more RF channels 1-400.

In various embodiments, the signal source or single-channel signal generator 110 may include a signal processor and a signal generator. The signal processor may further include a digital microprocessor and memory, which may include volatile and/or nonvolatile memory, including random access memory (RAM), read only memory—for example electrically erasable programmable read only memory (EEPROM), FLASH memory, etc. In some embodiments, the memory may store instructions to be executed by the digital microprocessor to cause the digital microprocessor to perform one or more algorithms for generating a plurality of baseband test sequences to be supplied to the DUT 10, as discussed in greater detail below. Such a signal processor may also include firmware, one or more application specific integrated circuits (ASICs), digital signal processors (DSPs), programmable gate arrays, etc.

In the embodiments, the combiner network 120 may be configured with a plurality of combiner stages, wherein each combiner stage may include one or more combiners. For example, each combiner may be a two-input device. Other configurations of a combiner network are possible. For example, in other embodiments, a combiner network may include a plurality of stages of four-input devices, or even a single stage with one N-input device.

In a beneficial feature, the combiner network 120 may be calibrated so that the transfer function (e.g., signal amplitude loss and or phase shift) from each RF signal through combiner network 120 is known absolutely and/or with respect to each other (i.e., the losses and phase shifts for the different RF signals are known with respect to each other). Calibration data for the various RF signals may be stored in memory, for example a memory of single-channel measurement instrument 130, such that single-channel measurement instrument 130 may produce calibrated measurement or test results for each of the RF channels 1-N of DUT 10.

In some embodiments, single-channel measurement instrument 130 may include an RF test instrument. In some embodiments, the single-channel measurement instrument 130 may include a single-channel signal analyzer, e.g., an RF signal analyzer, such as a spectrum analyzer. However, in general, the single-channel measurement instrument 130 may be any test or measurement instrument which can measure one or more parameters of any RF signal generated by the DUT 10.

In some embodiments, the test system 100 may include more than one single-channel measurement instrument which may operate in parallel to measure different parameters of the single-channel test signal output by combiner network 120.

As set forth above, even though the RF signals are combined by combiner network 120 to produce a single-channel test signal, the single-channel measurement instrument 130 may resolve or separate each individual RF signal from the single-channel test signal so as to individually test or measure one or more parameters of any one of the RF channels 1-N from the combined single-channel test signal output by combiner network 120.

In some embodiments, one or more of the operations may be performed by a digital microprocessor and memory of signal processor, as discussed above. For example, in some embodiments the digital microprocessor may execute an algorithm according to instructions stored in memory (e.g., nonvolatile memory) to generate the autocorrelation test signal. In some embodiments, the digital microprocessor may execute an algorithm according to instructions stored in memory (e.g., nonvolatile memory) to generate autocorrelation test signal.

In some embodiments, baseband data sequences for the autocorrelation test signal may be stored in a memory, for example a nonvolatile memory such as an EEPROM or FLASH device, and may be read from the nonvolatile memory by a digital microprocessor.

In some embodiments, the baseband data sequences, may be designed by a signal design system and communicated therefrom to the signal source or single-channel signal generator 110. In some embodiments, such a signal design system may include a general purpose computer including one or more digital microprocessors, memory (including volatile and/or nonvolatile memory), data storage (e.g., a hard disk or FLASH memory drive), one or more interfaces (e.g., an Ethernet port, wireless network interface, etc.) for communicating with signal source or single-channel signal generator 110, and a user interface which may include one or more of a display, keyboard, keypad, touchscreen, mouse, trackball, microphone, etc.

In some embodiments, a user may execute one or more software algorithms stored in memory and/or data storage of a signal design system to design or set parameters for the baseband data sequences, used by a signal processor, and may communicate this data via an interface. In some embodiments, such a signal design system may only be connected to signal source or single-channel signal generator 110 during a system design or system configuration phase for the test system 100.

In some embodiments, the single-channel measurement instrument 130 sequentially measures one or more characteristics of RF channels 1-N, one at a time. In various embodiments, the single-channel measurement instrument 130 may measure one or more of the following characteristics of each RF channel: output power level, occupied bandwidth, signal-to-noise ratio (SNR), harmonic output levels, harmonic distortion, signal-to-noise-plus-interference ratio (SNIR), etc.

Figure 6:
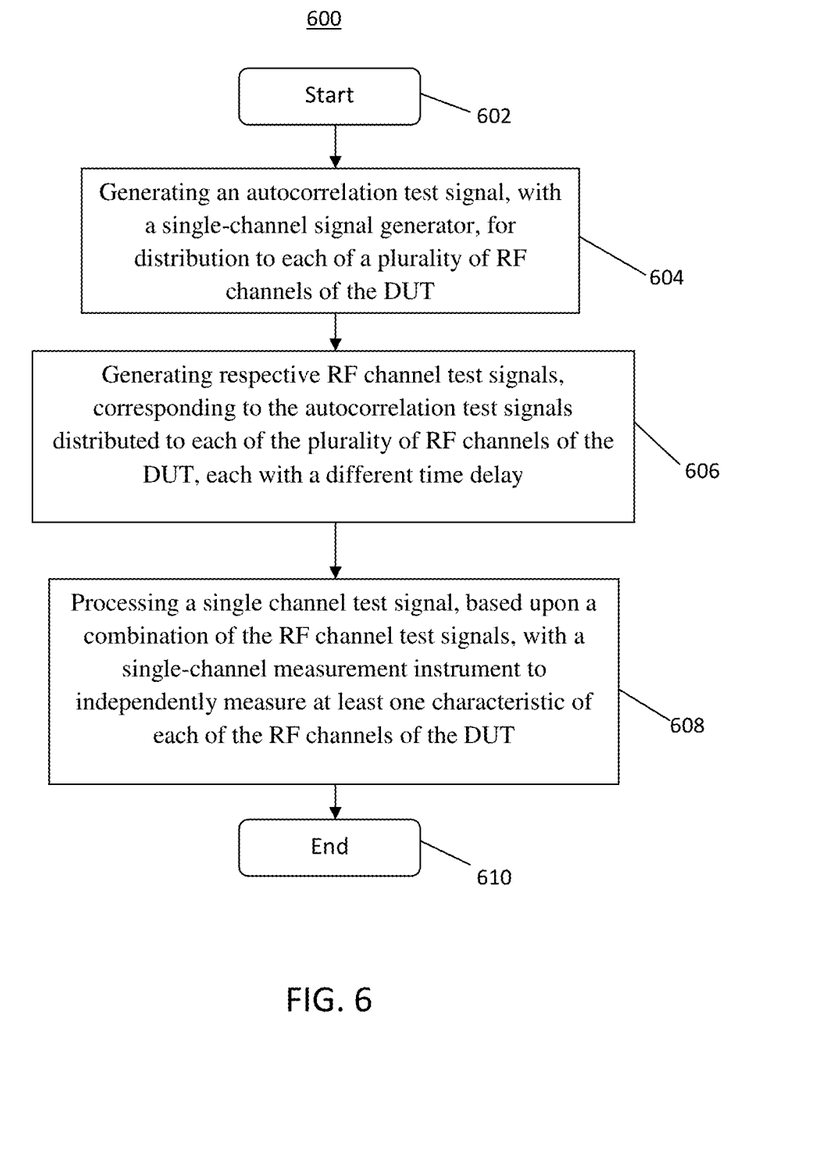
FIG. 6 is a flowchart of an example embodiment of a method of testing a multi-channel RF system or DUT.

FIG. 6 is a flowchart of an example embodiment of a method 600 of testing a multi-channel RF system or device such as DUT 10. In some embodiments, the method 600 may be used to test and/or calibrate a plurality of RF transmitters or receivers of a multi-channel RF device or system, specifically a multi-channel RF communication device or system, for example a massive multi-input, multi-output (MIMO) communication system. In some embodiments, the method 500 may be performed by test system 100, 300, 400 or 500 to measure one or more characteristics of the RF channels 1-N of DUT 10.

The method 600 of testing a DUT 10, which includes a plurality of RF channels 1-N, begins (602) and includes (block 604) generating an autocorrelation test signal, with a single-channel signal generator 110, for distribution to each of a plurality of RF channels 1-N of the DUT 10. The method includes (block 606) generating respective RF channel test signals, corresponding to the autocorrelation test signals distributed to each of the plurality of RF channels 1-N of the DUT 10, each with a different time delay. At block 608, the method includes processing a single-channel test signal, based upon a combination of the RF channel test signals, with a single-channel measurement instrument 130 to independently measure at least one characteristic of each of the RF channels 1-N of the DUT 10, before ending at block 610.

As discussed above, in the present embodiments the autocorrelation test signal may be output from the single-channel signal generator 110 to a time offset network 105 to apply the different time delays of the respective RF channel test signals before input to the plurality of channels 1-N of the DUT 10 as illustrated in the embodiment of FIG. 1. Alternatively, a corresponding autocorrelation test signal may be output from each of the plurality of channels 1-N of the DUT 10 to a time offset network 105 to apply the different time delays of the respective RF channel test signals before input to the single-channel measurement instrument 130 as illustrated in the embodiment FIG. 3.

Again, the measured characteristic of each of the RF channels 1-N may include a power level, a bandwidth, and/or a distortion of the corresponding RF channel test signal from each of the RF channels 1-N of the DUT 10. The RF channel test signals, combined in the single-channel test signal, may be overlapped in a time domain. And, the single-channel signal generator 110 may be configured to generate the autocorrelation test signal having autocorrelation characteristics including zero at non-zero time offset and non-zero at zero time offset.

The advantages of the system and method of the present embodiments is that a test approach may be provided with both faster test speed and lower cost. The test system and method use calibrated distribution/combiner networks and a time offset network that perform a parallel multi-channel RF performance test instead of using a slower switching approach. The test system and method use single-channel signal generation and signal analysis instruments to do the multi-channel RF performance test which results in a reduced test cost compared to a multi-channel instrument testing approach.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A test system, comprising:
    a single-channel signal generator configured to generate an autocorrelation test signal to be distributed to each of a plurality of RF channels of a device under test (DUT);
    a time offset network including a plurality of time offset channels each corresponding to one of the plurality of RF channels of the DUT, and configured to, in combination with the DUT, provide corresponding autocorrelation test signals each with a different time delay as respective RF channel test signals;
    a single-channel measurement instrument configured to process a single-channel test signal, based upon a combination of the RF channel test signals, to independently measure at least one characteristic of each of the RF channels of the DUT; and
    a distribution network downstream of the single-channel signal generator and configured to distribute the autocorrelation test signal for each of the plurality of RF channels of the DUT.

2. The test system of claim 1, wherein the time offset network is configured to be coupled between the single-channel signal generator and the DUT.

3. The test system of claim 1, wherein the time offset network is configured to be coupled between the DUT and the single-channel measurement instrument.

4. The test system of claim 1, further comprising a combiner network configured to combine the RF channel test signals and to provide the single-channel test signal to the single-channel measurement instrument.

5. The test system of claim 4, wherein the combiner network comprises a calibrated combiner network configured to combine the RF channel test signals in a cable-conducted test mode and to output the single-channel test signal to the single-channel measurement instrument.

6. The test system of claim 4, wherein the combiner network comprises an antenna arrangement configured to combine the RF channel test signals in an over-the-air (OTA) test mode and to provide the single-channel test signal to the single-channel measurement instrument.

7. The test system of claim 1, wherein the distribution network comprises a calibrated distribution network configured to distribute the autocorrelation test signal in a cable-conducted test mode for each of the plurality of RF channels of the DUT.

8. The test system of claim 1, wherein the distribution network comprises an antenna arrangement configured to distribute the autocorrelation test signal in an over-the-air (OTA) test mode for each of the plurality of RF channels of the DUT.

9. The test system of claim 1, wherein the at least one characteristic of each of the plurality of RF channels includes at least one of a power level, a bandwidth, and a distortion of a corresponding one of the RF channel test signals from each of the RF channels of the DUT.

10. The test system of claim 1, wherein the DUT includes optical outputs; and further comprising an optical-to-electrical converter coupled to optical outputs of each of the plurality of RF channels of the DUT upstream of the single-channel measurement instrument.

11. The test system of claim 1, wherein the DUT includes optical inputs; and further comprising an electrical-to-optical converter coupled to optical inputs of each of the plurality of RF channels of the DUT downstream of the single-channel signal generator.

12. The test system of claim 1, wherein the RF channel test signals, combined in the single-channel test signal, are overlapped in a time domain.

13. The test system of claim 1, wherein the single-channel signal generator is configured to generate the autocorrelation test signal having autocorrelation characteristics including zero at non-zero time offset and non-zero at zero time offset.

14. A method of testing a device under test (DUT) including a plurality of RF channels, the method comprising:
    generating an autocorrelation test signal, with a single-channel signal generator, for distribution to each of a plurality of RF channels of the DUT;
    generating respective RF channel test signals, corresponding to the autocorrelation test signals distributed to each of the plurality of RF channels of the DUT, each with a different time delay; and
    processing a single-channel test signal, based upon a combination of the RF channel test signals, with a single-channel measurement instrument to independently measure at least one characteristic of each of the RF channels of the DUT; and
    distributing the autocorrelation test signal for each of the plurality of RF channels of the DUT with a distribution network downstream of the single-channel signal generator, wherein the distribution network comprises a calibrated distribution network configured to distribute the autocorrelation test signal in a cable-conducted test mode for each of the RF channels of the DUT.

15. The method of claim 14, wherein the autocorrelation test signal is output from the single-channel signal generator to a time offset network to apply the different time delays of the respective RF channel test signals before input to the plurality of channels of the DUT.

16. The method of claim 14, wherein a corresponding autocorrelation test signal is output from each of the plurality of channels of the DUT to a time offset network to apply the different time delays of the respective RF channel test signals before input to the single-channel measurement instrument.

17. The method of claim 14, further comprising combining the RF channel test signals in a combiner network to provide the single-channel test signal to the single-channel measurement instrument.

18. The method of claim 17, wherein the combiner network comprises a calibrated combiner network configured to combine the RF channel test signals in a cable-conducted test mode and to output the single-channel test signal to the single-channel measurement instrument.

19. The method of claim 17, wherein the combiner network comprises an antenna arrangement configured to combine the RF channel test signals in an over-the-air (OTA) test mode and to provide the single-channel test signal to the single-channel measurement instrument.

20. The method of claim 14, wherein the distribution network comprises an antenna arrangement configured to distribute the autocorrelation test signal in an over-the-air (OTA) test mode for each of the RF channels of the DUT.

21. The method of claim 14, wherein the at least one characteristic of each of the RF channels includes at least one of a power level, a bandwidth, and a distortion of the corresponding RF channel test signal from each of the RF channels of the DUT.

22. The method of claim 14, wherein the DUT includes optical outputs; and further comprising an optical-to-electrical conversion from each optical output of the plurality of RF channels of the DUT upstream of the single-channel measurement instrument.

23. The method of claim 14, wherein the DUT includes optical inputs; and further comprising an electrical-to-optical conversion for each optical input of the plurality of RF channels of the DUT downstream of the single-channel signal generator.

24. The method of claim 14, wherein the RF channel test signals, combined in the single-channel test signal, are overlapped in a time domain.

25. The method of claim 14, wherein the single-channel signal generator is configured to generate the autocorrelation test signal having autocorrelation characteristics including zero at non-zero time offset and non-zero at zero time offset.

* * * * *